(12) United States Patent
Hui et al.

(10) Patent No.: US 8,630,677 B2
(45) Date of Patent: Jan. 14, 2014

(54) DISTRIBUTED BEAM SELECTION FOR CELLULAR COMMUNICATION

(75) Inventors: Dennis Hui, Sunnyvale, CA (US); Jiann-Ching Guey, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 242 days.

(21) Appl. No.: 13/183,834

(22) Filed: Jul. 15, 2011

(65) Prior Publication Data
US 2013/0017855 A1  Jan. 17, 2013

(51) Int. Cl.
*H04B 7/00* (2006.01)

(52) U.S. Cl.
USPC ...... 455/522; 455/524; 455/452.1; 455/452.2

(58) Field of Classification Search
USPC ............. 455/522, 509, 513, 525, 452.2, 63.1, 455/67.11, 39, 73, 422.1, 69, 562.1, 101, 455/575.7, 550.1, 272, 103, 67.13, 452.1, 455/418, 436, 450; 370/208, 330, 329, 252, 370/335, 203, 328, 260, 350, 280, 281, 336, 370/436, 210, 230.1, 430, 267, 315, 320, 370/342
See application file for complete search history.

(56) References Cited

U.S. PATENT DOCUMENTS

| | | | |
|---|---|---|---|
| 2010/0056215 A1* | 3/2010 | Gorokhov et al. | 455/561 |
| 2011/0064035 A1* | 3/2011 | Guerreiro et al. | 370/329 |
| 2011/0081865 A1 | 4/2011 | Xiao et al. | |
| 2011/0090976 A1* | 4/2011 | Kim et al. | 375/260 |
| 2011/0223928 A1* | 9/2011 | Seo et al. | 455/452.1 |
| 2011/0319092 A1* | 12/2011 | Kim et al. | 455/452.1 |
| 2011/0319118 A1* | 12/2011 | Yu et al. | 455/522 |

FOREIGN PATENT DOCUMENTS

WO  WO2011/071470  6/2011

OTHER PUBLICATIONS

International Search Report and Written Opinion in corresponding international application No. PCT/IB2012/052267 dated Oct. 7, 2012.
Hayssam Dahrouj et al., "Coordinated beamforming for the multicell multi-antenna wireless system", IEEE Transactions on Wireless Communications, vol. 9, No. 5, May 1, 2010.
David Gesbert et al., "Multi-cell MIMO cooperative networks: a new look at interference", IEEE Journal on Selected Areas in Communications, vol. 28, No. 9, Dec. 1, 2010.
China Mobile Research Institute, "C-RAN the Road Towards Green RAN," white paper, Ver 1.0.0, Apr. 2010.

(Continued)

*Primary Examiner* — Edward Urban
*Assistant Examiner* — Golam Sorowar
(74) *Attorney, Agent, or Firm* — Nixon & Vanderhye P.C.

(57) ABSTRACT

A group of multiple base stations implements distributed and coordinated antenna beamforming selection to achieve increased performance. Each of the base stations in the group determines an associated optimal set of antenna beam direction parameters in a distributed manner based on local radio information exchanged between neighboring ones of the base stations. Each of the base stations transmits to one or more user equipments (UEs) served by that base station using its associated optimal set of beam direction parameters. The local radio information generated by one of the base stations indicates how the transmissions of its neighbor base stations affect the performance of the base station. The performance of a base station may be measured by the difficulty or challenge in maintaining a minimum desired signal quality, e.g., a minimum SINR, for the UE served by the base station.

40 Claims, 5 Drawing Sheets

(56) References Cited

OTHER PUBLICATIONS

A. Ekbal and J.M. Cioffi, "Distributed Transmit Beamforming in Cellular Networks—A Convex Optimization Persepective," Proc. ICC, pp. 2690-2694, May 2005.

G.J. Foschini and Z. Miljanic, "Distributed Autonomous Wireless Channel Assignment Algorithm with Power Control," IEEE Trans. Veh. Tech., vol. 44, No. 3, Aug. 1995.

B.L. Ng, J.S. Evans, S.V. Hanly and D. Aktas, "Distribued Downlink Beamforming with Cooperative Base Stations," *IEEE Trans. Info. Thy.*, vol. 54, pp. 5491-5499, Dec. 2008.

E. Dahlman, S. Parkvall, J. Skold and P. Peming, 3G Evolution, HSPA and LTE for Mobile Broadband, $2^{nd}$ Edition, Academic Press, 2008.

T. Adiono, A.W. Ardiansyah, and R. Novie, "The Future Trend of MIMO Technology in WiMax," Proc. $1^{st}$ IWoRMEE, pp. 38-42, Aug. 2009.

S. Boyd and L. Vandenberghe, *Convex Optimization*, Cambridge Unversity Press, 2004.

\* cited by examiner

DISTRIBUTED BEAM SELECTION FOR CELLULAR COMMUNICATION

TECHNICAL FIELD

The technology relates to radio communications, and particular, to radio transmission beamforming.

BACKGROUND

The explosive rise in popularity of smart phones has exposed the capacity limitation of the current cellular networks. The increasing usage of bandwidth-demanding multimedia and social networking applications on mobile devices further exacerbates the problem. To cope with the exponential growth in wireless data traffic, it is anticipated that significantly denser deployment of access nodes will be required in the future. Such dense deployment may be achieved by augmenting the existing base stations with a denser mix of "smaller" (pico or femto) base stations with reduced signal footprints.

As the distance among base stations reduces, the impact of their mutual interference can become more significant than that in the current cellular network due to the reduced path loss, the increased probability of direct line-of-sight interference, and the overlapping coverage of base stations from different hierarchical layers. This can substantially limit the achievable data throughput of individual users that can otherwise be attainable with the dense deployment. This is especially true for those users located near the cell boundary. Intelligent methods of coordinating transmission among neighboring base stations to reduce their mutual interference in a dense network are therefore highly desirable. Since future traffic pattern is not known a priori and may evolve differently in different geographical areas, it is also desirable for these methods of interference management to be scalable with, and autonomously adaptable to, any new deployment patterns.

In traditional cellular networks, little coordination is performed among the transmissions of neighboring base stations. Each base station typically tries to maximize the throughput of their own users in a greedy manner and relies on the receivers to suppress interference through the use of advanced receiver algorithms. Interference management at the network side is mainly accomplished through careful planning of frequency reuse patterns across the network to avoid using the same set of radio resource simultaneously in adjacent cells. However, as the demand for wireless data services continue to increase, the operators would have to aggressively reuse radio resources in adjacent cells and utilize more advanced interference coordination methods to mitigate interference at the network side.

One proposal is that interference coordination and radio resource management over an entire network in a metropolitan area can be performed in a central processing unit. Although such a centralized solution provides flexibility in managing and sharing network equipments, it also has its share of potential drawbacks. First, it demands fast backhaul communication links between the base stations and the centralized unit in order to make available the signal received from each base station at the central unit in a timely manner for coordination. For the network to be able to dynamically handle interference coordination for varying load patterns in a short time frame, significant latency-intolerant traffic need to be communicated over the backhaul. The cost of installing the required high-capacity backhaul links can be prohibitive for many developed countries. Moreover, the reliability of the network over a wide area depends solely on the central unit, implying a relatively low fault-tolerance as any malfunctions and system downtimes can be reflected on the entire network. Hence, it can be more vulnerable to malicious attacks. Furthermore, the central unit and its associated backhaul may not scale easily with new deployment of base stations in response to the future traffic growth, since adding a new cell site requires not only a new backhaul connection to the central unit but also a possible change in the processing algorithms to accommodate the new site in the overall coordination task.

Due to the potential drawbacks of centralized solutions, methods of distributing the task of interference coordination over all base stations in the network have received considerable interest recently. Decentralized interference coordination is robust to equipment failure since any equipment malfunctions only affect the local network performance and may readily be compensated by neighboring base stations in a dense network. It also tends to scale better with new deployment of base stations in response to traffic growth as no backhaul connection between new base stations and a remote central unit is needed. Furthermore, it facilitates parallel processing and can reap more benefits from the economy of scale than the centralized solutions.

For a base station equipped with more than one transmit antennas, one important aspect of interference coordination is to select beamforming weights for its antennas so that it can focus the radio signal energy on the user equipment (or mobile) being served while limiting the impact of its interference to those users served by other base stations. Most of the existing distributed methods of computing beamforming weights require each base station to be able to communicate with all other base stations in the network. Such distributed solutions still impose challenging latency requirements on the backhaul in a large network. Moreover, in many future wireless data communication systems, such as the Long-Term Evolution (LTE) and WiMax, predefined codebooks of beamforming weights were standardized so that equipment manufacturers can exploit the structure of the codebook to maximize the amplifier efficiency and to reduce the complexity of computing precoded signals. Most of the existing distributed methods of computing beamforming weights do not work when they are restricted to come from a predefined, standard codebook.

SUMMARY

A first base station included in a network having multiple neighbor base stations serves a first user equipment (UE) according to a first quality of service. Each neighbor base station serves a corresponding neighbor UE. Local radio performance parameter information is acquired from the neighbor base stations, and antenna beamforming parameters are selected for the first base station to use to transmit to the first UE based on the local radio performance parameter information. The first base station transmits a radio signal to the first UE using the selected antenna beamforming parameters.

The local radio performance parameter information generated by each one of the base stations may indicate how its neighbor base station transmissions affect that base station's performance. The local radio performance parameter information is exchanged between these base stations to distributively coordinate beamforming parameter selection by the first and neighbor base stations. Another aspect is that the local radio performance parameter information generated by a base station indicates a degree of challenge to fulfill a quality of service for the UE served by the base station while taking into account degrees of challenge presented to the neighbor base stations to serve their corresponding neighbor UEs with corresponding quality of services.

The first base station also provides local radio performance parameter information to the neighbor base stations. In one example embodiment, the local radio performance parameter information is exchanged over multiple iterations, and the first base station selects the antenna beamforming parameters based on the iteratively acquired local radio performance parameter information. For example, the quality of service might include a minimum signal to interference-plus-noise ratio (SINR). The local radio performance parameter information indicates how base station transmission power changes in the neighbor base stations affect the minimum SINR.

In a non-limiting example implementation, an uplink channel covariance matrix associated with an uplink channel from the first UE to the first base station is acquired or determined as is one or more uplink channel covariance matrices associated with uplink channels from one or more UEs served by the neighboring base stations to the first base station. The local radio performance parameter information for the first base station may then be determined based on the uplink channel covariance matrices and the local radio performance parameter information received from neighbor base stations.

In a non-limiting example implementation, the local radio performance parameter information is updated based on an updated uplink channel covariance matrix received from the first UE, one or more updated uplink channel covariance matrices received from UEs served by neighbor base stations, and the updated local radio performance parameter information received from neighbor base stations.

In a non-limiting example implementation, the selection of antenna beamforming parameters for a base station is determined based on an uplink channel covariance matrix received from the first UE, one or more updated channel covariance matrices received from UEs served by the neighbor base stations, and the updated local radio performance parameter information from the neighbor base stations.

An example of antenna beamforming parameters is beamforming weights. In this case, the first base station may select a combination of the antenna beamforming parameters from a codebook of predetermined combinations of beamforming weights. The selected combination of the antenna beamforming parameters corresponds to a particular antenna beam direction for transmitting to the first UE. The first base station preferably notifies the neighbor base stations of the selected antenna beamforming parameters and receives information regarding the beamforming parameters selected by the neighboring base stations.

In a non-limiting example embodiment, a transmit power level for the first base station is updated to transmit to the first UE based on the received beamforming parameters selected by the neighbor base stations. The transmit power level information is received from the neighbor base stations, and a transmit power level for the first base station to transmit to the first UE is updated based on the received transmit power level information from the neighbor base stations.

In a preferred but non-limiting example embodiment, the first base station selects optimal antenna beamforming parameters based on the local radio performance parameter information by determining a solution for a non-convex optimization problem where a total transmit power for the first and neighbor base stations is minimized while satisfying a first quality of service for the first UE and corresponding quality of services the neighbor UEs. The solution for the non-convex optimization problem includes converting the non-convex optimization problem into a convex optimization problem by relaxing a domain of one or more optimization variables.

Another aspect of the technology relates to a method implemented by and a system including a group of multiple base stations. Each of the base stations in the group determines an associated optimal set of antenna beam direction parameters in a distributed manner based on local radio information exchanged between neighboring ones of the base stations. Each base station transmits to one or more user equipments (UEs) served by that base station using its associated optimal set of beam direction parameters. The base stations may include for example one or more of the following types of base stations: pico, macro, femto, micro, and home base stations. Preferably, though not necessarily, each of the base stations acquires and provides the local radio information over multiple iterations and selects the optimal set of beam direction parameters based on the iteratively acquired local radio information.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks may are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology in this case, which may be applied to any radio communications system and/or network, presents method and apparatus for coordinating the selection of antenna beamforming weights for multiple the base stations in a network in a distributed manner. Each base station exchanges information with neighboring base stations (as opposed to every base station in the network) as well as nearby mobile radios. Based on that information, each base station determines an optimal selection of beamforming weights, e.g., that leads to the least amount of total power consumption in the network in order to fulfill prescribed quality-of-service requirements as specified by the mobile radio users mobile users in the network. The exchange is preferably iterative, and the information exchanged includes, in a preferred example embodiment, local radio performance parameter information. More generally, the information may simply be local radio information. The communication exchange between two neighboring base stations may take place over one or more wireless and/or wired backhaul link(s). Wireless links may be on the same or different frequency bands used to communicate with the mobile radios or separate, possibly unlicensed, frequency band(s) may be used. A non-limiting example of a wired backhaul link could be based on the standard X2 interface. In WCDMA-based systems, the backhaul link(s) may be provided by a radio network controller (RNC).

In an example implementation, the beamforming weights may be derived from a predefined standardized codebook to provide codebook-based beamforming.

The distributed optimal selection of beamforming weights, in preferred but example embodiment, is based on a solution of an optimization problem described in detail below. Preferably, that problem is solved efficiently by relaxing the domain of optimization from beam selection indices to probabilities of beam selection for all the base stations at issue by allowing each base station to randomly select which beam to use to transmit signal to its served user with a certain probability distribution.

Figure 1:
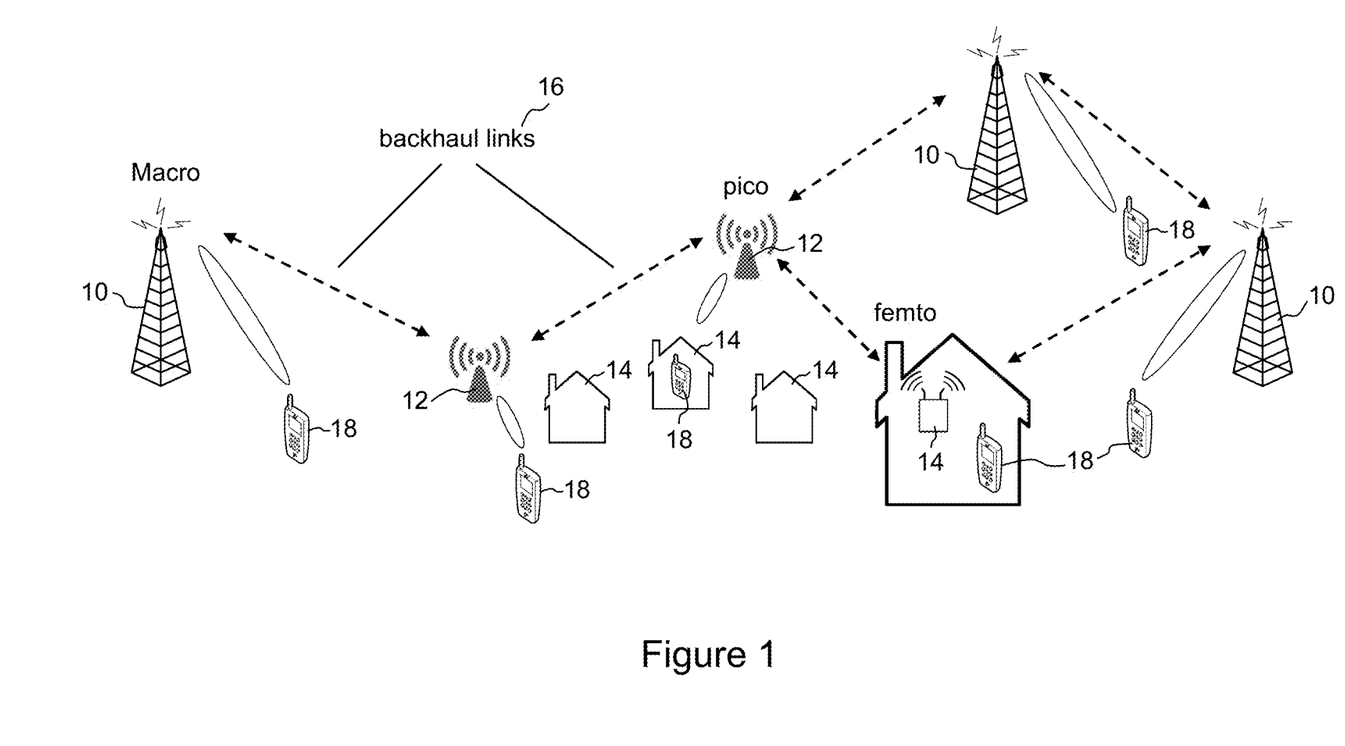
FIG. 1 illustrates a radio communications network with distributed coordination between base stations for beamforming selection and other related radio parameters.

Consider the non-limiting example radio communications network with distributed coordination between base stations for beamforming selection and other related radio parameters shown in FIG. 1. A mix of macro base stations (BSs) 10, pico BSs 12, and indoor femto BSs 14 occupying the same frequency spectrum coordinate downlink transmission in a cellular communication network. The BSs may all be of the same types, or other types of BSs may be included in the network. In other words, the technology may be applied to homogeneous networks and/or heterogeneous networks.

Each BS is equipped with a number of multiple transmit antennas for serving its own scheduled user equipment (UE). The number of transmit antennas may be the same or different across the BSs. When multiple or all of the BSs occupy the same spectrum, they mutually interfere. But by using the distributed beamforming determination technology in this application, these BSs jointly (in a distributed manner) determine or select, (e.g., select from respective predefined codebooks), an optimal set of beam directions at which each of the BSs should transmit so that the quality of service of all UEs being served by these BSs can be satisfied using the least amount of total transmit power. The distributed determination or selection process is accomplished through local communications between neighboring BSs over backhaul links.

Figure 2:
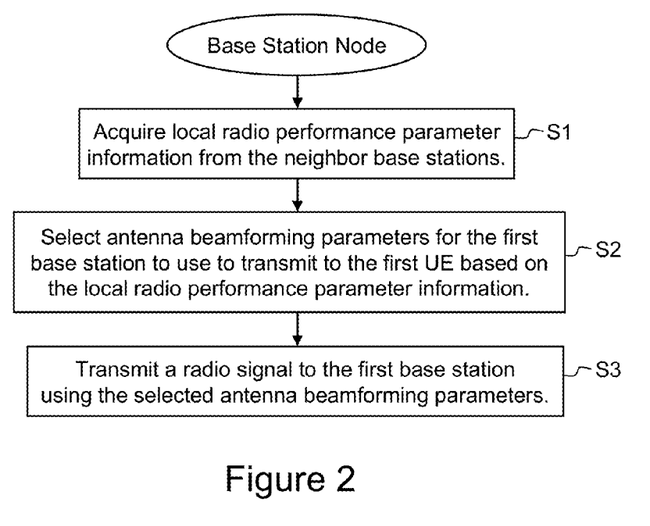
FIG. 2 is a non-limiting flowchart illustrating example procedures for a base station node in a distributed coordination network such as the example shown in FIG. 1.

FIG. 2 is a non-limiting flowchart illustrating example procedures for a base station node in a distributed coordination network such as the example shown in FIG. 1. The base station serves a user equipment (UE) according to a quality of service, e.g., a minimum SINR level, and the neighbor base stations each serves a corresponding neighbor UE with a corresponding quality of service. Initially, the first base station acquires local radio performance parameter information from the neighbor base stations (step S1). Based on the local radio performance parameter information, the base station selects antenna beamforming parameters for the first base station to use to transmit to the first UE (step S2). An example of antenna beamforming parameters is beamforming weights, and in one example implementation, particular combinations of beamforming weights may be selected from a beamforming weight codebook. The base station then transmits a radio signal to the first base station using the selected antenna beamforming parameters (step S3).

Figure 3:
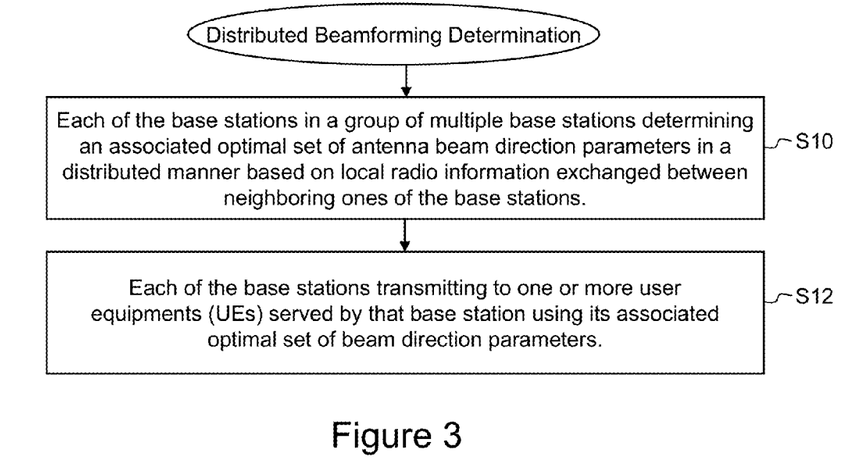
FIG. 3 is a non-limiting flowchart illustrating example procedures for distributed beamforming determinations by a group of base stations.

FIG. 3 is a non-limiting flowchart illustrating example procedures for distributed beamforming determinations by a group of base stations. Each of the base stations in the group determines an associated optimal set of antenna beam direction parameters in a distributed manner based on local radio information exchanged between neighboring ones of the base stations (step S10). Each base station then transmits to one or more user equipments (UEs) served by that base station using its associated optimal set of beam direction parameters.

The local radio information generated by a base station indicates how the transmissions of neighbor base stations affect the performance of the base station. In a specific non-limiting example application, the local radio information represents a degree of challenge to fulfill the quality of service for the UE served by the base station while taking into account degrees of challenge presented to the neighbor base stations to serve their corresponding neighbor UEs with the corresponding quality of service. For example, the local radio information may indicate how base station transmission power changes in the neighbor base stations affect the ability to maintain a minimum desired signal quality, e.g. a minimum SINR, for the UE served by the base station. As explained in the detailed example below, the local radio information generated by each base station may be based on an uplink channel covariance matrix acquired from a served UE and the local radio information generated by and received from neighbor base stations.

Because this is a distributed beam direction parameter selection/determination process, each of the base stations distributes local radio information to and receives local radio information from neighboring base stations. Each base station may also receive transmit power level information from the neighbor base stations and provide its own transmit power level information to its neighbors. Some or all of this exchanged information may be used by each of the base stations to modify its transmit power level.

The following explains using mathematics one non-limiting and example way of accomplishing distributed or coordinated beamforming optimization among a group of multiple base stations. In this example, the group includes all of the base stations in the network, but the group may include fewer or more than all the base stations in a particular network. Let B denote a set of indices of all BSs in a network. The BSs may also be referred to as access nodes, or just nodes, in the network. In a heterogeneous network like the example depicted in FIG. 1, the set B is a union of $B_{macro}$, $B_{pico}$, and $B_{femto}$, which denotes the set of a group of some or even all macro, pico, and femto base station in the network, respectively. For each node $i \in B$, let $\mathcal{N}_i \subset B$ denote the set of the neighboring nodes with which there is a backhaul communication link, where $\mathcal{N}_i$ is the neighbor list of node i.

For each node $i \in B$, also let $\mathcal{N}_i^I$ denote the set of all nodes other than node i whose transmissions cause significant interference to the UEs being served by node i, and let $\bar{\mathcal{N}}_i^I \equiv \{j \in B : i \in \mathcal{N}_j^I\}$, referred to as the dual of $\mathcal{N}_i^I$, be the set of all nodes whose served mobiles are interfered by the transmission of node i. In general, $\mathcal{N}_i^I$ and its dual set $\bar{\mathcal{N}}_i^I$ may contain different sets of nodes. Assume here that $\mathcal{N}_i$ contains both $\mathcal{N}_i^I$ and $\bar{\mathcal{N}}_i^I$, or more precisely, $\mathcal{N}_i = \mathcal{N}_i^I \cup \bar{\mathcal{N}}_i^I$. The dual of the dual of $\mathcal{N}_i^I$ must contain the same set of nodes as $\mathcal{N}_i^I$, since, by definition: $\bar{\bar{\mathcal{N}}}_i^I = \{j \in B : i \in \bar{\mathcal{N}}_j^I\} = \{j \in B : j \in \mathcal{N}_i^I\} = \mathcal{N}_i^I$. The neighboring relationship, as defined by $\mathcal{N}_i$, is symmetric in the sense that $j \in \mathcal{N}_i$ if and only if $i \in \mathcal{N}_j$.

To avoid excessive notation, the formulation below assumes that each node cell serves only one UE that is equipped with a single receive antenna in each radio resource block, e.g., each time-frequency resource block. With this assumption, the UE served by base station or node i is simply referred to as the i th UE. Those skilled in the art will understand that the formulation and algorithms disclosed here can also be applied when multiple UEs are served simultaneously by each cell in each radio resource block by treating a base station serving multiple users as multiple co-located base stations, each serving only one UE.

Let $h_{ij}$ denote a $n_{T,i} \times 1$ multi-input single-output (MISO) channel from node i to UE j (i.e. the UE served by node j), and let $w_i$ denote a $n_{T,i} \times 1$ vector of beamforming weights adopted by node i, where $n_{T,i}$ is then number of transmit antennas at node i. The signal y received by the j th UE can be modeled as $$y_j = h_{jj}^H w_j s_j + \underbrace{\sum_{i \in N_j} h_{ij}^H w_i s_i}_{\text{Interference from neighboring cells}} + w_j \quad (1)$$

where $s_j$ denotes the data symbol transmitted by node j intended for UE j, and $w_j$ denotes the noise component observed by UE j with variance $\sigma_j^2 \equiv E|w_j|^2$. If the number of antennas $n_{R,j}$ of UE j is more than one, then the MISO channel $h_{ij}$ may be viewed as a composite channel of an underlying $n_{R,j} \times n_{T,i}$ MIMO channel and a $n_{R,j} \times 1$ vector $z_i$ of combining weights used by the UE j such that $h_{ij} = z_j^H H_{ij}$, so long as $z_j$ depends only on the desired channel $H_{jj}$.

From (1), the signal-to-interference-plus-noise-ratio (SINR) for UE j is given by $$SINR_j \equiv \frac{E|h_{jj}w_j s_j|^2}{\sum_{i \in N_j} E|h_{ij}w_i s_i|^2 + \sigma_j^2} = \frac{w_j^H R_{jj} w_j}{\sum_{i \in N_j} w_i^H R_{ij} w_i + \sigma_j^2} \quad (2)$$

where $R_{ij} \equiv E h_{ij} h_{ij}^H$ is the transmit channel covariance matrix for the link between BS i and UE j. (Other signal quality measures could be used). The goal is to find the optimal set of beamforming vectors $\{w_j\}_{j \in B}$ that minimizes the total transmit power used by the group of base stations while satisfying a given set of minimum SINR requirements $\{\gamma_j\}_{j \in B}$ for all of the served UEs. Each beamforming weight vector $w_j$ is restricted in this non-limiting, example implementation to be within a scale factor of one of the $N_j$ beamforming directions stored in a predefined beamforming codebook $C_j = \{v_{j,1}, v_{j,2}, \ldots, v_{j,N_j}\}$, where $\|v_{j,k}\| = 1$ for all j and k. More specifically, the beamforming vector $w_j$ for UE j is in the form:

$$w_j = \sqrt{P_j} v_{j,k}$$

where $v_{j,k}$ denotes the selected beam direction, and $P_j = \|w_j\|^2 \geq 0$ denotes a non-negative transmit power level used by node j to transmit to its served UE j.

Let $b(j) \in \{1, 2, \ldots, N_j\}$ denote the index of beam direction in codebook $C_j$ by BS j. The objective is to find the set of beam indices $\{b(j)\}_{j \in B}$ that solves the following optimization problem:

$$\inf_{\{(P_j, b(j))\}_{j \in B}} \sum_{j \in B} P_j \quad (3)$$

subject to $$SINR_j = \frac{P_j v_{j,b(j)}^H R_{jj} v_{j,b(j)}}{\sum_{i \in N_j} P_i v_{j,b(i)}^H R_{ij} v_{j,b(i)} + \sigma_j^2} \geq \gamma_j \text{ for all } j \in B \quad (4)$$

The problem described by equations (3) and (4) is a discrete, and thus non-convex, optimization problem. In particular, the set of all possible choices of beamforming weights is not a convex set. An exhaustive search over all possible beam selection combinations in most practical applications is likely to be a computationally infeasible solution. Fortunately, the inventors discovered an efficient algorithm for solving this problem.

In order to coordinate transmission across different nodes to fulfill desired SINR (or other signal quality parameter) requirements, assume that each node $j \in B$ in the network can acquire the transmit channel covariance matrix $R_{jj}$ for its own scheduled UE j and the transmit channel covariance matrices $\{R_{ji}\}_{i \in \mathcal{N}_j}$ for each UE scheduled by a neighboring node in its neighbor list $\mathcal{N}_j$ for the particular block of radio resource assigned to UE j. This can be accomplished either through a dedicated feedback channel in the uplink, through measurements on the uplink transmissions, or from all UEs served by the neighboring nodes. Although transmit channel covariance matrices are used in this example, other channel transfer function representations may be used.

In a preferred example implementation, the non-convex optimization problem (i.e., how to minimize the total transmit power for the group of base stations while satisfying the first quality of service and the corresponding quality of services for the served UEs) is converted to a convex optimization problem by relaxing a domain of one or more optimization variables, e.g., by relaxing the beam indices referred to above.

After relaxing the domain of the optimization variables to form a convex set, the inventors show that the modified convex optimization problem must have the same solution as the original, non-convex optimization problem. A distributed algorithm for computing the solution is then derived based on the dual problem (which is always a convex problem) of the modified problem. More specifically, because the modified problem is a convex optimization problem, the solution for its dual problem may be transformed into a solution of the modified problem so long as the original problem has a solution.

Each BS randomly chooses the beamforming directions from its codebook $C_j$ with a certain probability distribution. Let $P_{j,k}$ denote the probability of BS j choosing the beam direction with index k, and let $P_j \equiv (p_{j,1}, p_{j,2}, \ldots, p_{j,N_j})^T$ be the corresponding probability mass function (pmf), which satisfies $1_{N_j}^T p_j = 1$, where $1_{B_j}$ denotes an $N_j \times 1$ vector of all ones. The desired goal is to find the best set of pmfs $\{p_j\}_{j \in B}$ (instead of the beam indices $\{b(j)\}_{j \in B}$) that minimizes the total transmit power in from the group of base stations while still satisfying on average a given set of minimum SINR requirements $\{\gamma_j\}_{j \in B}$ for all UEs when the beam directions are chosen randomly according to the selected pmfs. More formally, the following optimization problem is to be solved:

$$\inf_{\{(P_j, p_j)\}_{j \in B}} \sum_{j \in B} P_j \qquad (5)$$

subject to the set of constraints:

$$SINR_j = \frac{\sum_{k=1}^{M_j} p_{j,k} P_j v_{j,k}^H R_{jj} v_{j,k}}{\sum_{i \in N_j} \sum_{k=1}^{M_i} p_{i,k} P_i v_{i,k}^H R_{ij} v_{i,k} + \sigma_j^2} \geq \gamma_j \text{ for all } j \in B, \qquad (6)$$

which can be expressed as $$\gamma_j \sum_{i \in N_j} \sum_{k=1}^{M_i} p_{i,k} P_i v_{i,k}^H R_{ij} v_{i,k} + \gamma_j \sigma_j^2 - \sum_{k=1}^{M_j} p_{j,k} P_j v_{j,k}^H R_{jj} v_{j,k} \leq 0 \qquad (7)$$

for all $j \in B$.

If the solution of this problem is of the special form $p_{j,k} = \delta(k - k_j)$ for all $j \in B$ (i.e., BS j selects the beam index $k_j$ with a probability of one), where $\delta(\square)$ denotes the dirac delta function, this is equivalent to setting the beam indices to $b(j) = k_j$ for all $j \in B$. Therefore, in this case, $b(j) = k_j$, $j \in B$, is also a solution to the discrete optimization problem described by (3) and (4). As shown later, at least one solution of the problem described in (5) and (7) will have this special form of $p_{j,k}$.

The problem described by (5) and (7) may be expressed succinctly as a min-max optimization problem:

$$\inf_{\{(P_j, p_j)\}_{j \in B}} \sup_{\{\lambda_j\}_{j \in B}} L(\{\lambda_j\}_{j \in B}, \{P_j\}_{j \in B}, \{p_j\}_{j \in B}) \qquad (8)$$

where $\{\lambda_j\}_{j \in B}$ are the nonnegative dual variables corresponding to the constraints in (7), $1_{N_j}^T p_j = \sum_{k=1}^{N_j} p_{j,k} = 1$ for all $j \in B$, and $$L(\{\lambda_j\}_{j \in B}, \{P_j\}_{j \in B}, \{p_j\}_{j \in B}) \equiv \sum_{j \in B} P_j +$$

$$\sum_{j \in B} \lambda_j \left[ \gamma_j \sigma_j^2 + \sum_{i \in N_j} \gamma_j \sum_{k=1}^{N_i} p_{i,k} P_i v_{i,k}^H R_{ij} v_{i,k} - \sum_{k=1}^{N_j} p_{j,k} P_j v_{j,k}^H R_{jj} v_{j,k} \right]$$

is the Lagrangian of the optimization problem described by (5) and (7), which can be expressed, after some manipulation as:

$$L(\{\lambda_j\}_{j \in B}, \{P_j\}_{j \in B}, \{p_j\}_{j \in B}) \equiv \qquad (9)$$

$$\sum_{j \in B} \lambda_j \gamma_j \sigma_j^2 + \sum_{j \in B} P_j \sum_{k=1}^{N_j} p_{j,k} \left[ v_{j,k}^H \left( I + \sum_{i \in N_j} \lambda_i \gamma_i R_{ji} - \lambda_j R_{jj} \right) v_{j,k} \right].$$

Because the problem described by (8) (or equivalently (5) and (7)) is convex, it can be solved by finding a solution to the dual optimization problem given by:

$$\sup_{\{\lambda_j\}_{j \in B}} \inf_{\{(P_j, p_j)\}_{j \in B}} L(\{\lambda_j\}_{j \in B}, \{P_j\}_{j \in B}, \{p_j\}_{j \in B}) = \qquad (10)$$

$$\sup_{\{\lambda_j\}_{j \in B}} \left\{ \sum_{j \in B} \lambda_j \gamma_j \sigma_j^2 + \sum_{j \in B} \inf_{\{(P_j)\}_{j \in B}} \left\{ P_j \inf_{p_j} \left\{ \sum_{k=1}^{N_j} p_{j,k} \left[ v_{j,k}^H \left( I + \sum_{i \in N_j} \lambda_i \gamma_i R_{ji} - \lambda_j R_{jj} \right) v_{j,k} \right] \right\} \right\} \right\}.$$

Since $P_j$ can be arbitrarily large in (10), a solution of the problem will result in an undesirable optimal value (negative infinity) for the objective function unless:

$$v_{j,k}^H \left( I + \sum_{i \in N_j} \lambda_i \gamma_i R_{ji} - \lambda_j R_{jj} \right) v_{j,k} \geq 0$$

for all $j \in B$ and $k = \{1, 2, \ldots, N_j\}$, which is equivalent to $$\lambda_j \leq \left( \max_{k \in \{1,2,\ldots,N_j\}} \frac{v_{j,k}^H R_{jj} v_{j,k}}{v_{j,k}^H \left( I + \sum_{i \in N_j} \lambda_i \gamma_i R_{ji} \right) v_{j,k}} \right)^{-1} \quad (11)$$

for all $j \in B$.

Hence, the dual problem in (10) can be expressed as $$\sup_{\{\lambda_j\}_{j \in B}} \sum_{j \in B} \lambda_j \gamma_j \sigma_j^2 \quad (12)$$

subject to the constraints described by (11).

Each dual variable $\lambda_j$ in (11) and (12) corresponds to a node j in the group of base stations. Each dual variable $\lambda_j$ may be viewed as a measure of how challenging it is for node j to fulfill its own SINR (or other signal quality parameter) constraint while taking into account how challenging it is for its neighboring nodes to fulfill their respective SINR constraints. The larger the value of $\lambda_j$ is, the more difficult it is to fulfill the SINR constraint of the UE served by node j. On the other extreme, the SINR constraint for the UE served by node j can be satisfied if $\lambda_j=0$. For these reasons, these dual variables $\{\lambda_j\}$ are referred to as local radio performance parameter information associated with the base stations in the group. These dual variables $\{\lambda_j\}$ are again just a non-limiting example of local radio performance parameter information.

This equivalent dual problem described by (11) and (12) is solved using a distributed algorithm that iteratively exchanges local radio performance parameter information $\{\lambda_j\}$ among neighboring nodes and updating them at each node according to (11). After determining the solution $\{\lambda_j^*\}$ for the dual problem, the optimal beam selection probabilities $\{p_j^*\}$ are obtained by substituting $\{\lambda_j^*\}$ into (8) and (9), which yields $$p_j^* = \underset{p_j}{\mathrm{argmin}} \left\{ \sum_{k=1}^{N_j} p_{j,k} \left[ v_{j,k}^H \left( I + \sum_{i \in N_j} \lambda_i^* \gamma_i R_{ji} - \lambda_j^* R_{jj} \right) v_{j,k} \right] \right\} \quad (13)$$

Equation (13) indicates that an optimal beam selection probability for node j must have a probability one in the beam index $k_{min,j}$ that corresponds to the smallest value in the set $$\left\{ v_{j,k}^H \left( I + \sum_{i \in N_j} \lambda_i \gamma_i R_{ji} - \lambda_j R_{jj} \right) v_{j,k} : k \in \{1, 2, \ldots, N_j\} \right\}$$

and a probability zero in all other beam indices. In the unlikely scenario where the smallest value is achieved by multiple beam index values, any of these beam index values will give the same performance. Hence, computing (13) is equivalent to directly finding the optimal beam index $\{b(i)\}$ as:

$$b^*(j) = \underset{k \in \{1,2,\ldots,N_j\}}{\mathrm{argmin}} \left\{ v_{j,k}^H \left( I + \sum_{i \in N_j} \lambda_i^* \gamma_i R_{ji} - \lambda_j^* R_{jj} \right) v_{j,k} \right\} \quad (14)$$

Given that (11) indicates that $\lambda_j^* > 0$ for all $j \in B$, the SINR constraints must all be active, and the optimal power levels $\{P_j^*\}$ can be obtained by solving the set of equations corresponding to the SINR constraints:

$$P_j^* v_{j,b^*(j)}^H R_{jj} v_{j,b^*(j)} - \sum_{i \in N_j} \gamma_j P_i^* v_{i,b^*(i)}^H R_{ji} v_{i,b^*(i)} = \gamma_j \sigma_j^2 \quad (15)$$

for all $J \in B$.

Figure 4:
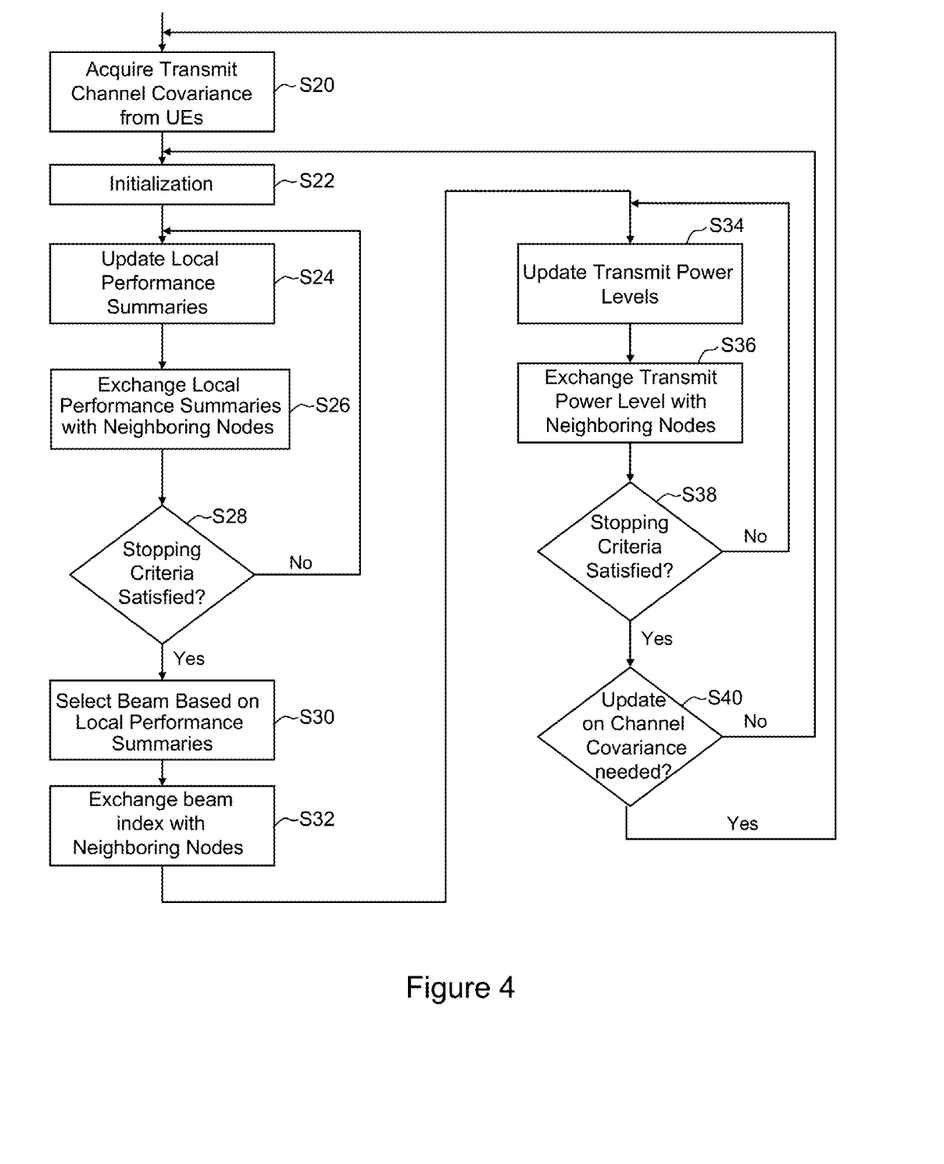
FIG. 4 is a non-limiting flowchart illustrating example procedures for a base station node in a distributed coordination network in accordance with a detailed but non-limiting example embodiment.

FIG. 4 is a non-limiting flowchart illustrating example distributed algorithm procedures for finding an optimal set of beam indices based on equations (11), (14), and (15) for each base station node in a distributed coordination network in accordance with a detailed but non-limiting example embodiment.

Each node $j \in B$ in the BS group acquires downlink channel state information (CSI) (either through measurements on uplink or through a dedicated feedback channel) in terms of the transmit channel covariance matrix $R_{jj}$ (in this example) for its own scheduled UE j, and the transmit channel covariance matrices $\{R_{ji}\}_{i \in \mathcal{N}_j}$ for each UE scheduled by a neighboring node in its neighbor list $\mathcal{N}_j$ for a particular radio resource block (step S20).

Each node $j \in B$ initializes local radio performance parameter information $\lambda_j^{(0)}$ to zero or a predetermined small value, transmit power level $P_j^{(0)}$ to a predetermined value, and the iteration indices $\{n, m\}$ to zeros, and, if necessary, sends $\lambda_j^{(0)}$ and $P_j^{(0)}$ to all neighboring nodes in its neighbor list $\mathcal{N}_j$ over backhaul links (step S22).

Based on local radio performance parameter information $\{\lambda_i^{(n)}\}_{i \in \mathcal{N}_j}$ received from the neighboring nodes, each node $j \in B$ updates its own local radio performance parameter information $\lambda_j^{(n)}$ (step S24) using for example:

$$\lambda_j^{(n+1)} = \left( \max_{k \in \{1,2,\ldots,N_j\}} \frac{v_{j,k}^H R_{jj} v_{j,k}}{v_{j,k}^H \left( I + \sum_{i \in N_j} \lambda_i^{(n)} \gamma_i R_{ji} \right) v_{j,k}} \right)^{-1}.$$

Each node $j \in B$ sends $\lambda_j^{(n+1)}$ and $P_j^{(n+1)}$ to all neighboring nodes in its neighbor list $\mathcal{N}$ over backhaul links (step S26).

In block S28, an iteration index n is incremented and control returns to step S24 unless one or more stopping criteria is satisfied. A non-limiting example stopping criterion is whether the iteration index n is larger than a maximum value predefined for example over the entire network. Another example is whether the percentage change from $\lambda_j^{(n)}$ to $\lambda_j^{(n+1)}$ is less than a predefined threshold.

Each node j∈B selects the beam index b(i) as $$b(j) = \underset{k \in \{1,2,\ldots,N_j\}}{\operatorname{argmin}} v_{j,k}^H \left( I + \sum_{i \in N_j} \lambda_i^{(n_f)} \gamma_i R_{ji} - \lambda_j^{(n_f)} R_{jj} \right) v_{j,k}$$

where $n_f$ denotes the final value of the iteration index n (step S30). Each node j∈B sends b(j) to all neighboring nodes in its neighbor list $\mathcal{N}_j$ over backhaul links (step S32).

Based on the transmit power levels $\{P_i^{(m)}\}_{i \in \mathcal{N}_j}$ of the neighboring nodes, each node j∈B updates its own transmit power level $P_j^{(m)}$ (step S34) by:

$$P_j^{(m+1)} = \min\left( \gamma_j \frac{\sigma_j^2 + \sum_{i \in N_j} P_i^{(m)} v_{i,b^*(i)}^H R_{ij} v_{i,b^*(i)}}{v_{j,b^*(j)}^H R_{jj} v_{j,b^*(j)}}, P_{max,j} \right)$$

where $P_{max,j}$ denotes the maximum power level supported by node j. Each node j∈B sends $P_j^{(m+1)}$ to all neighboring nodes in its neighbor list $\mathcal{N}_j$ over backhaul links (step S36).

In decision block S38, an iteration index m is incremented, and control returns to step S34 unless one or more stopping criteria is satisfied. An example stopping criterion is whether the iteration index m is larger than a maximum value predefined over the entire network. Another example is whether the percentage change from $P_j^{(m)}$ to $P_j^{(m+1)}$ is less than a predefined threshold. If the one or more stopping criteria is not satisfied, then control returns to step S22. Otherwise, if updating of channel covariance is not needed, each node j∈B sets the transmit power level as $P_j = P_j^{(m_f)}$, where $m_f$ denotes the final value of the iteration index m. Control returns to step S20 periodically to update $R_{jj}$ and $\{R_{ji}\}_{i \in \mathcal{N}_j}$ at each node j (step S40).

Because the updates for local radio performance parameter information $\{\lambda_j\}_{j \in B}$ and the beam indices (steps S24-S30) do not depend on the update of $\{P_j\}_{j \in B}$ (steps S32-S38), each node can skip the steps (or portions of the steps) that correspond to the update of power levels if only the beam indices, but not the power, are of interest.

Step S24 may be approximated by the inverse of the maximum generalized eigen-value of the matrices $R_{jj}$ and $$\left( I + \sum_{i \in N_j} \lambda_i^{(n)} \gamma_i R_{ji} \right)$$

with little or no loss in performance. In other words, step S24 may be computed as:

$$\lambda_j^{(n+1)} = \left( \max_v \frac{v^H R_{jj} v}{v^H \left( I + \sum_{i \in N_j} \lambda_i^{(n)} \gamma_i R_{ji} \right) v} \right)^{-1} = \frac{1}{\lambda_{max}\left( \left( I + \sum_{i \in N_j} \lambda_i^{(n)} \gamma_i R_{ji} \right)^{-1} R_{jj} \right)}$$

where $\lambda_{max}(A)$ denotes the maximum singular value of matrix A. This is particularly helpful for reducing the computational complexity for large codebooks.

The distributed algorithm may be applied to slow beamforming when the beamforming weights are computed based on frequency-independent channel statistics like a transmit channel covariance matrix as well as to fast beamforming when the beamforming weights are computed based on instantaneous, frequency-dependent channel state information. For the latter application, a single instantaneous channel realization $h_{ij}$ may be used to compute a transmit covariance $R_{ij}$ (i.e., $R_{ij} = h_{ij} h_{ij}^H$).

Figure 5:
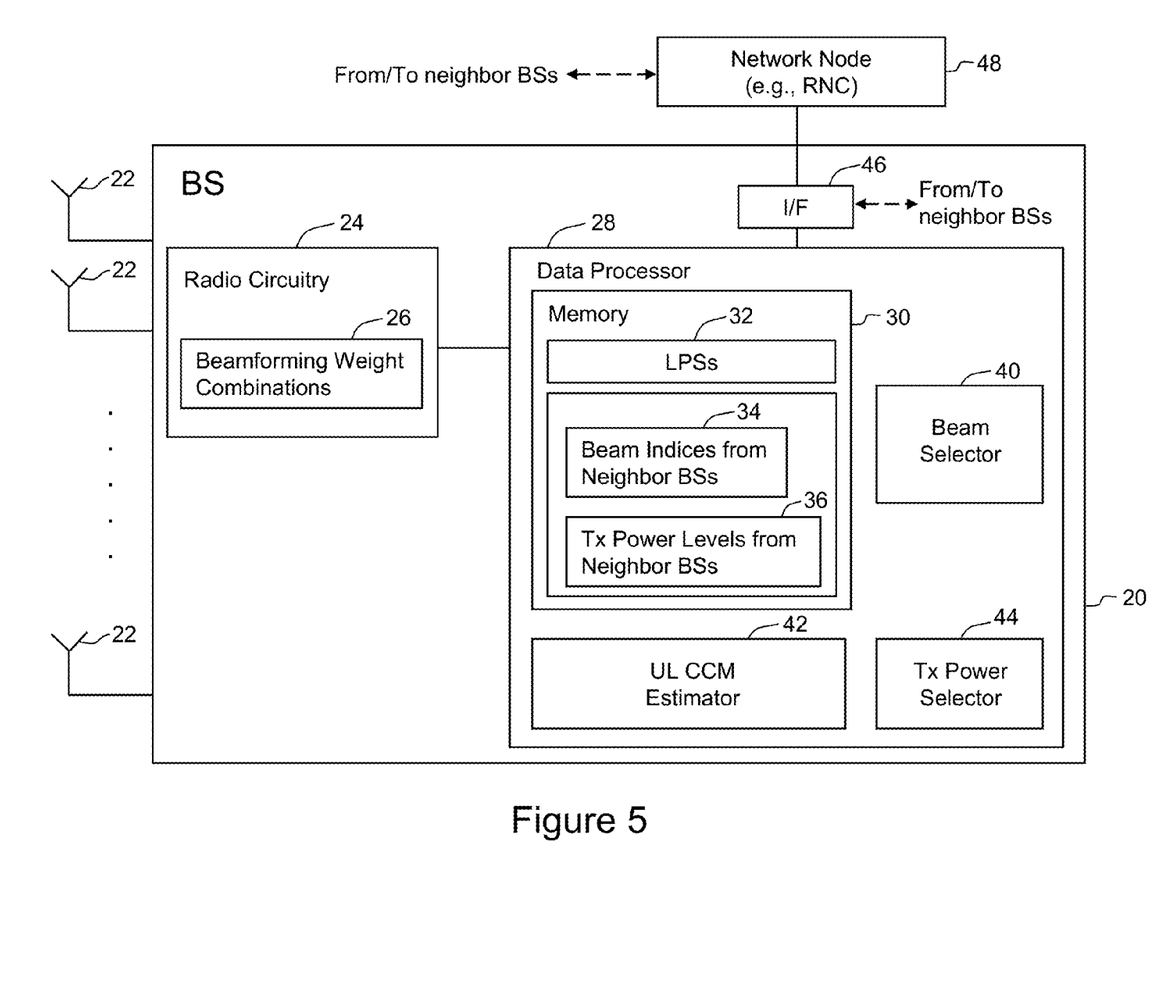
FIG. 5 is a non-limiting, example function block diagram of base station that may be used to perform the functions in FIG. 4.

FIG. 5 is a non-limiting, example function block diagram of base station (BS) 20 that may be used to perform its part of the functions outlined in FIG. 4. The base station 20 is equipped with multiple antennas 22 coupled to radio circuitry 24 configured to perform necessary radio transmitting and receiving operations. One of the transmitting operations includes applying a selected combination of beamforming weights selected from possible beamforming weight combinations 26. In the non-limiting example embodiment, the possible beamforming weight combinations may be determined from a predefined beamforming weight codebook.

The radio circuitry is coupled to a data processor 28 which is also responsible for selecting the beamforming weight combination to be used by the radio circuitry for downlink transmissions to a particular UE using the distributed/coordinated procedures described above. A memory 30 stores for example local radio performance parameter information for base station 20 as well as for neighboring base stations. The memory may also store beam indices provided from neighboring base stations 34 and transmit power levels 36 indicated by neighboring base stations. An antenna beam selector 40 selects a combination of beamforming weights based on the local radio performance parameter information. A transmit channel covariance matrix (CCM) estimator 42 determines the CCM from information provided by the UE(s) in its cell. As mentioned above, some other channel state information other than the CCM may be used. A transmit power selector 44 determines the transmit power level for the radio circuitry for base station transmissions based for example on beam indices received from other base stations.

The base station 20 also includes one or more interfaces 46 for use in exchanging local radio performance parameter information, beam selection type information, and/or transmit power information with neighboring base stations. In one example embodiment, that information is exchanged over backhaul links which can be wired, optical, wireless, etc. and direct or indirect. An example of an indirect link is via another network node like a radio network controller, a core network node, another base station, a relay, etc.

Figure 6:
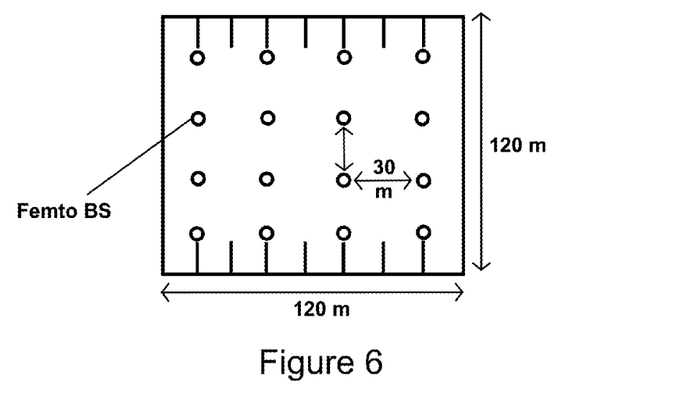
FIG. 6 illustrates an example test simulation.

FIG. 6 illustrates an example test simulation for the example distributed beam selection algorithm outlined in FIG. 4 in a modified IMT-advanced indoor environment. The modified IMT-advanced indoor environment includes 16 femto base stations placed uniformly 30 m apart between each other in a 120 m by 120 m room. Each femto BS includes 4 omni-directional transmit antennas with a maximum total power of 0.126 W. UEs, each with 1 omni-directional receive antenna, were placed randomly in the room and associated with the BS with the strongest received signal strength.

Figure 7:
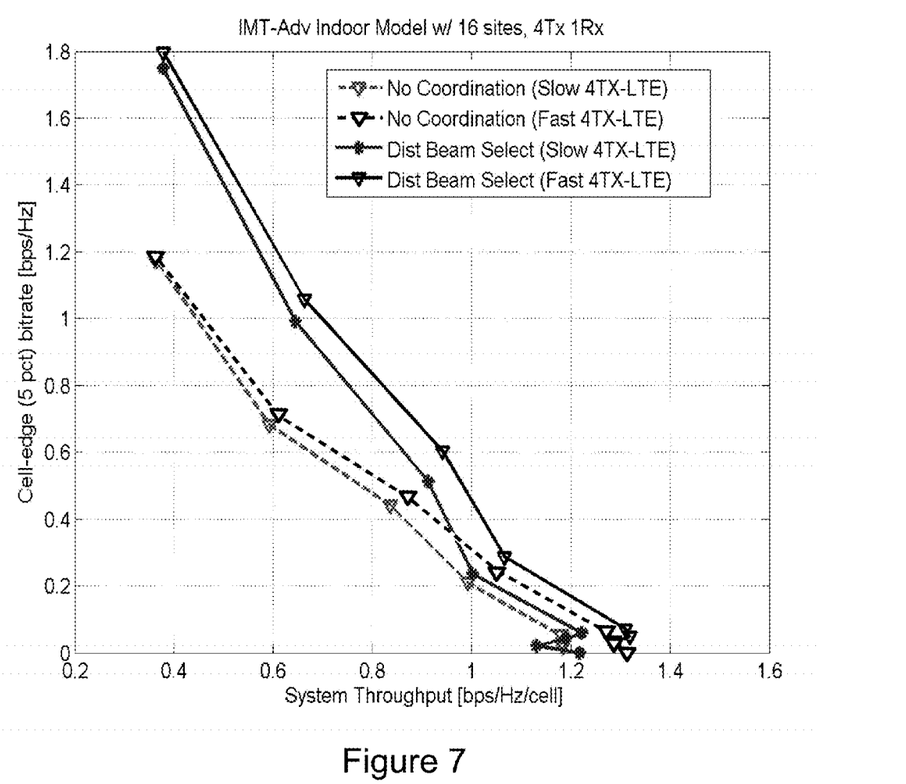
FIG. 7 is a non-limiting, example graph of bitrate v. system throughput for various beam selection approaches in the simulated test environment.

FIG. 7 is a non-limiting, example of the test system performance in terms of system throughput versus 5-percentile user throughput using a standard LTE codebook for 4×1 MISO channels. For comparison, the system performance with no coordination among BSs is shown. In the case with no coordination, each BS j∈B greedily maximizes the received signal power at its served UE by choosing the beam direction $v_{j,k}$ in the codebook $C_j$ that yields the maximum value of $v_{j,k}^H R_{jj} v_{j,k}$ and by using the maximum allowable power. Performance with fast and slow beamforming is shown. In the case of fast beamforming, the instantaneous, frequency-dependent channel state information (instead of just the transmit channel covariance) is needed at the base station. As shown in the figure, a system employing the distributed/coordinated beam selection algorithm enjoys significant performance gain at low to moderate system load compared to a system with no coordination. Moreover, according to one non-limiting example embodiment, the local radio performance parameter information exchanged between two neighbor base stations only contains a scalar quantity which means that the data rate required for such inter-base-station communication is quite small.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a first base station included in a network having multiple neighbor base stations, where the first base station is configured to serve a first user equipment (UE) and the neighbor base stations each serves a corresponding neighbor UE, the method comprising:
acquiring local radio performance parameter information from the neighbor base stations;
selecting antenna beamforming parameters for the first base station to use to transmit to the first UE based on the local radio performance parameter information; and
transmitting a radio signal to the first UE using the selected antenna beamforming parameters,
wherein the first base station selects optimal antenna beamforming parameters based on the local radio performance parameter information by determining a solution for a non-convex optimization problem where a total transmit power for the first and neighbor base stations is minimized while satisfying a first quality of service for the first UE and corresponding quality of services for the neighbor UEs.

2. The method in claim 1, wherein the local radio performance parameter information generated by each of the first and neighbor base stations indicates how the performance of that base station is affected by the transmissions of its neighbor base stations, and wherein the local radio performance parameter information is exchanged between the first and neighbor base stations to distributively coordinate beamforming parameter selection by the first and neighbor base stations.

3. The method in claim 1, wherein the local radio performance parameter information is acquired over multiple iterations and the first base station selects the antenna beamforming parameters based on the iteratively acquired local radio performance parameter information.

4. The method in claim 1, further comprising providing local radio performance parameter information from the first base station to the neighbor base stations.

5. The method in claim 1, where the first base station is configured to serve a first user equipment (UE) according to a first quality of service and the neighbor base stations each serve a corresponding neighbor UE with a corresponding quality of service, and wherein the local radio performance parameter information generated by a base station indicates a degree of challenge to fulfill the quality of service for the UE served by the base station while taking into account degrees of challenge presented to the neighbor base stations to serve their corresponding neighbor UEs with the corresponding quality of service.

6. The method in claim 5, wherein the quality of service includes a minimum signal to interference-plus-noise ratio (SINR), and wherein the local radio performance parameter information indicates how base station transmission power changes in the neighbor base stations affect the difficulty or challenge of the base station to fulfill the minimum SINR of the UE served.

7. The method in claim 1, further comprising:
acquiring or determining an uplink channel covariance matrix associated with an uplink channel from the first UE to the first base station and one or more uplink channel covariance matrices associated with uplink channels from one or more UEs served by the neighboring base stations to the first base station, and wherein the local radio performance parameter information for the first base station is determined based on the uplink channel covariance matrices and the local radio performance parameter information received from neighbor base stations.

8. The method in claim 1, further comprising:
updating the local radio performance parameter information based on an updated uplink channel covariance matrix received from the first UE, one or more updated uplink channel covariance matrices received from UEs served by neighbor base stations, and the local radio performance parameter information received from neighbor base stations.

9. The method in claim 1, wherein the selection of antenna beamforming parameters for a base station is determined based on an uplink channel covariance matrix received from the first UE, one or more updated channel covariance matrices received from UEs served by the neighbor base stations, and the local radio performance parameter information from the neighbor base stations.

10. The method in claim 1, wherein the antenna beamforming parameters are beamforming weights, and wherein the first base station selects a combination of the antenna beamforming parameters from a codebook of predetermined combinations of beamforming weights.

11. The method in claim 10, wherein the selected combination of the antenna beamforming parameters corresponds to a particular antenna beam direction for transmitting to the first UE.

12. The method in claim 1, further comprising notifying the neighbor base stations of the selected antenna beamforming parameters.

13. The method in claim 1, further comprising:
receiving beamforming parameters selected by the neighboring base stations.

14. The method in claim 13, further comprising:
updating a transmit power level for the first base station to transmit to the first UE based on the received beamforming parameters selected by the neighbor base stations.

15. The method in claim 14, further comprising:
receiving transmit power level information from the neighbor base stations, and
further updating a transmit power level for the first base station to transmit to the first UE based on the received transmit power level information from the neighbor base stations.

16. The method in claim 1, wherein the solution for the non-convex optimization problem includes converting the non-convex optimization problem into a convex optimization problem by relaxing a domain of one or more optimization variables.

17. A method implemented by a group of multiple base stations, comprising:
each of the base stations in the group determining an associated optimal set of antenna beam direction parameters in a distributed manner based on local radio information exchanged between neighboring ones of the base stations, and
each of the base stations transmitting to one or more user equipments (UEs) served by that base station using its associated optimal set of beam direction parameters,
wherein each of the base stations selects its associated optimal set of beam direction parameters based on the local radio information by determining a solution for a non-convex optimization problem where a total transmit power for all of the base stations is minimized while satisfying the minimum corresponding quality of services, and wherein the solution for the non-convex optimization problem includes converting the non-convex optimization problem into a convex optimization problem by relaxing a domain of one or more optimization variables.

18. The method in claim 17, wherein the base stations include one or more of the following types of base stations: pico, macro, femto, micro, and home base stations.

19. The method in claim 17, wherein each of the base stations acquires the local radio information over multiple iterations and selects the optimal set of beam direction parameters based on the iteratively acquired local radio information.

20. The method in claim 17, wherein the optimal sets of antenna beam direction parameters determined in a distributed manner for each of the base stations ensure that the UEs are served with at least a minimum corresponding quality of service using lowest transmit power levels from the base stations.

21. The method in claim 20, wherein the local radio information generated by one of the base stations indicates a degree of challenge to fulfill the minimum corresponding quality of service for the UE served by that base station while taking into account a degree of challenge presented to neighboring base stations to serve their corresponding neighbor UEs with a corresponding minimum quality of service.

22. The method of claim 17, wherein the local radio performance parameter information generated by one of the base stations indicates how the performance of the base station is affected by transmissions of its neighbor base stations.

23. The method in claim 17, further comprising:
each of the base stations acquiring or determining an uplink channel covariance matrix for an uplink channel associated with that base station and one or more uplink channel covariance matrices associated with uplink channels from one or more UEs served by its neighboring base stations to the base station, and wherein the local radio information generated by each of the base stations is based on the associated uplink channel covariance matrix, and
each of the base stations updating its local radio information based on an updated uplink channel covariance matrix, one or more updated uplink channel covariance matrices received from UEs served by its neighbor base stations, and the local radio information received from its neighbor base stations.

24. The method in claim 17, further comprising:
each of the base stations notifying neighboring base stations of its associated optimal set of beam direction parameters and receiving the associated optimal sets of beam direction parameters determined by the neighboring base stations.

25. The method in claim 24, further comprising:
each of the base stations updating its transmit power level based on the received associated optimal sets of beam direction parameters.

26. The method in claim 25, further comprising:
each of the base stations receiving transmit power level information from neighboring base stations, and
each of the base stations updating its transmit power level based on the received transmit power level information from the neighboring base stations.

27. A first base station configured to serve a first user equipment (UE) in a network having multiple neighbor base stations configured to serve a corresponding neighbor UE, the first base station comprising:
communications circuitry configured to acquire local radio performance parameter information from the neighbor base stations;
control circuitry configured to select antenna beamforming parameters for the first base station to use to transmit to the first UE based on the local radio performance parameter information; and
radio circuitry configured to transmit a radio signal to the first UE using the selected antenna beamforming parameters,
wherein the control circuitry is configured to select optimal antenna beamforming parameters based on the local radio performance parameter information by determining a solution for a non-convex optimization problem where a total transmit power for the first and neighbor base stations is minimized while satisfying a first quality of service associated with the first UE and corresponding quality of services associated with each of the neighbor UEs.

28. The first base station in claim 27, wherein the local radio performance parameter information generated by each of the first and neighbor base stations indicates how the performance of that base station is affected by transmissions of its neighbor base stations, and wherein the communications circuitry is configured to exchange local radio performance parameter information between the first and neighbor base stations to distributively coordinate beamforming parameter selection by the first and neighbor base stations.

29. The first base station in claim 27, wherein the communications circuitry is configured to acquire the local radio performance parameter information over multiple iterations and the control circuitry is configured to select the antenna beamforming parameters based on the iteratively acquired local radio performance parameter information.

30. The first base station in claim 27, wherein the local radio performance parameter information for a base station indicates how the performance of the base station is affected by a transmission of a neighbor base station.

31. The first base station in claim 30, wherein the control circuitry is configured to acquire or determine an uplink channel covariance matrix associated with an uplink channel from the first UE to the first base station and one or more uplink channel covariance matrices associated with uplink channels from one or more UEs served by the neighboring base stations to the first base station, and wherein the control circuitry is configured to determine the local radio performance parameter information for the first base station based on the uplink channel covariance matrices and the local radio performance parameter information received from neighbor base stations.

32. The first base station in claim 30, wherein the control circuitry is configured to update the local radio performance parameter information based on an updated uplink channel covariance matrix received from the first UE, one or more updated uplink channel covariance matrices received from UEs served by neighbor base stations, and the local radio performance parameter information received from neighbor base stations.

33. The first base station in claim 30, wherein the control circuitry is configured to select antenna beamforming parameters for a base station based on an uplink channel covariance matrix received from the first UE, one or more updated channel covariance matrices received from UEs served by the neighbor base stations, and the local radio performance parameter information from the neighbor base stations.

34. The first base station in claim 30, wherein the antenna beamforming parameters are beamforming weights, and wherein the control circuitry is configured to select a combination of the antenna beamforming parameters from a codebook of predetermined combinations of beamforming weights.

35. The first base station in claim 30, wherein the control circuitry is configured to update a transmit power level for the first base station to transmit to the first UE based on the beamforming parameters selected by the neighbor base stations.

36. The first base station in claim 35, wherein the control circuitry is configured to receive transmit power level information from the neighbor base stations and to further update a transmit power level for the first base station to transmit to the first UE based on the received transmit power level information from the neighbor base stations.

37. The first base station in claim 27, wherein the solution for the non-convex optimization problem is based on conversion of the non-convex optimization problem into a convex optimization problem by relaxing a domain of one or more optimization variables.

38. A system comprising a group of multiple base stations in a communications network, wherein:
   each of the base stations in the group is configured to determine an associated optimal set of antenna beam direction parameters in a distributed manner based on local radio information exchanged between neighboring ones of the base stations, and
   each of the base stations in the group is configured to transmit to one or more user equipments (UEs) served by that base station using its associated optimal set of beam direction parameters,
   wherein each of the base stations is configured to select optimal antenna beamforming parameters based on the local radio performance parameter information by determining a solution for a non-convex optimization problem where a total transmit power for the base station and neighbor base stations is minimized while satisfying a first quality of service associated with a UE served by the base station and corresponding quality of services associated with neighbor UEs.

39. The system in claim 38, wherein the base stations include one or more of the following types of base stations: pico, macro, femto, micro, and home base stations.

40. The system in claim 38, wherein the local radio performance parameter information for each of the base stations indicate the transmissions of its neighbor base stations affect the performance of the base station.

* * * * *